(12) United States Patent  
Park

(10) Patent No.: US 6,618,361 B1
(45) Date of Patent: Sep. 9, 2003

(54) METHOD OF RESETTING BUS FOR NETWORK CONNECTED BY IEEE 1394 BUS

(75) Inventor: Chang-won Park, Seoul (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/347,227

(22) Filed: Jul. 2, 1999

(30) Foreign Application Priority Data

Jul. 4, 1998 (KR) ........................................ 1998-26972

(51) Int. Cl.[7] .............................................. G06F 13/00
(52) U.S. Cl. ........................................ 370/257; 710/104
(58) Field of Search ................................ 709/250, 220, 709/221; 710/8, 9, 10, 126, 101–104; 370/254, 256, 255, 257, 258

(56) References Cited

U.S. PATENT DOCUMENTS 6,157,972 A * 12/2000 Newman et al. ............ 710/100
6,160,796 A * 12/2000 Zou ............................ 370/257
6,199,119 B1 * 3/2001 Duckwall et al. ........... 709/221
6,405,247 B1 * 6/2002 Lawande et al. ............ 709/220
6,496,485 B1 * 12/2002 Le ............................. 370/257

\* cited by examiner

*Primary Examiner*—Seema S. Rao
*Assistant Examiner*—Melanie Jagannathan
(74) *Attorney, Agent, or Firm*—Sughrue Mion, PLLC

(57) ABSTRACT

A bus reset method in a network connected by the IEEE 1394 bus is provided. The bus reset method in a network in which a plurality of apparatuses are connected by the IEEE 1394 bus includes the steps of (a) sensing the state change of a port, (b) confirming whether loops exist in the bus when it is sensed in step (a) that a new apparatus is connected to an apparatus of the network, (c) transmitting the bus configuration information of a slave node from the slave node to a master node when it is confirmed that loops do not exist in the step (b), (d) re-configuring the bus of the network from the transmitted bus configuration information and the existing bus configuration information of the master node, and (e) broadcasting the re-configured bus configuration information to all apparatuses connected to the network.

1 Claim, 4 Drawing Sheets

METHOD OF RESETTING BUS FOR NETWORK CONNECTED BY IEEE 1394 BUS

BACKGROUND OF THE INVENTION

1. Field of the Invention

The present invention relates to a method of resetting a bus for a network, and more particularly, to a method of resetting a bus for a network connected by the IEEE 1394 bus.

2. Description of the Related Art

The IEEE 1394 for digital network interfaces is being standardized. The IEEE 1394 bus has a digital bus protocol for connecting personal computers (PC) and digital electric home equipment to each other. The IEEE 1394 bus protocol is widely applied to equipment such as digital video cameras, hard disc drives, printers, and PCS. Also, the IEEE 1394 bus protocol is being extended from a bus protocol for simply connecting peripheral equipment to a computer, to a network protocol for performing data transmission among various systems such as PCS.

Figure 1A:
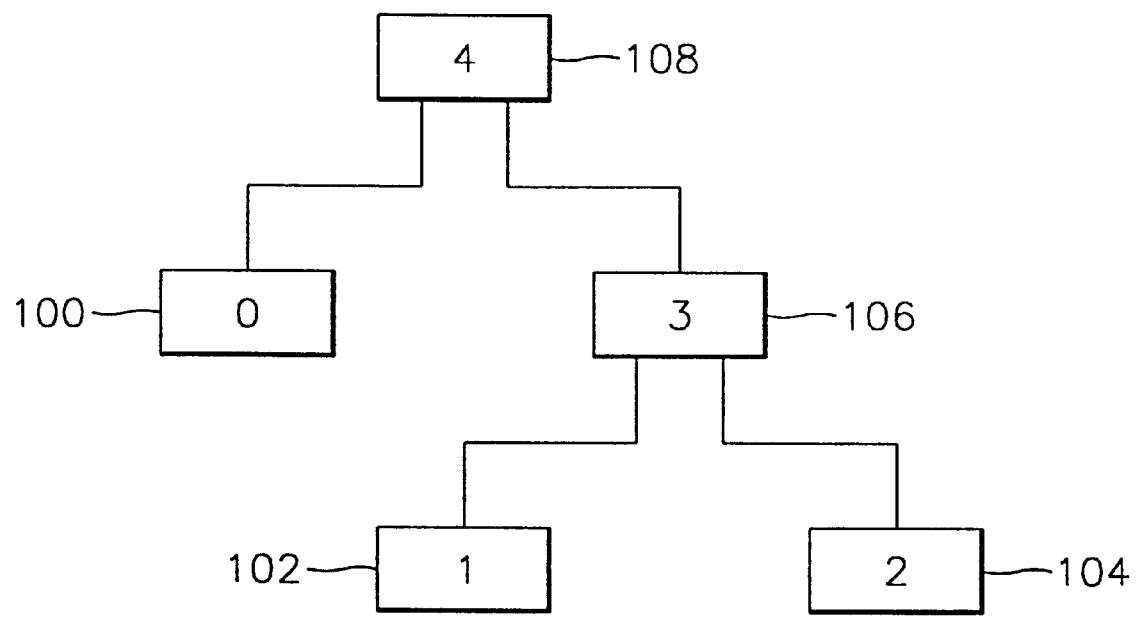
Figure 1B:
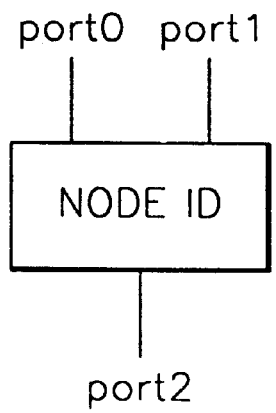

FIGS. 1A and 1B show an example of a network including IEEE 1394 equipment.

Referring to FIG. 1A, a plurality of apparatuses 100 through 108 which satisfy the IEEE 1394 standard are connected to the IEEE 1394 bus by 1394 cable. Here, the 1394 cable should not have loops. Namely, there should be only one 1394 cable path for connecting one apparatus to another. The respective apparatuses have ports (port0 through port2) to which the 1394 cable is connected, as shown in FIG. 1B. IEEE 1394 node IDs are designated to the respective apparatuses. The node IDs are used as the addresses of apparatuses when an apparatus transmits data to, and receives data from, another apparatus. The node IDs are re-assigned whenever the bus is reset.

Figure 2:
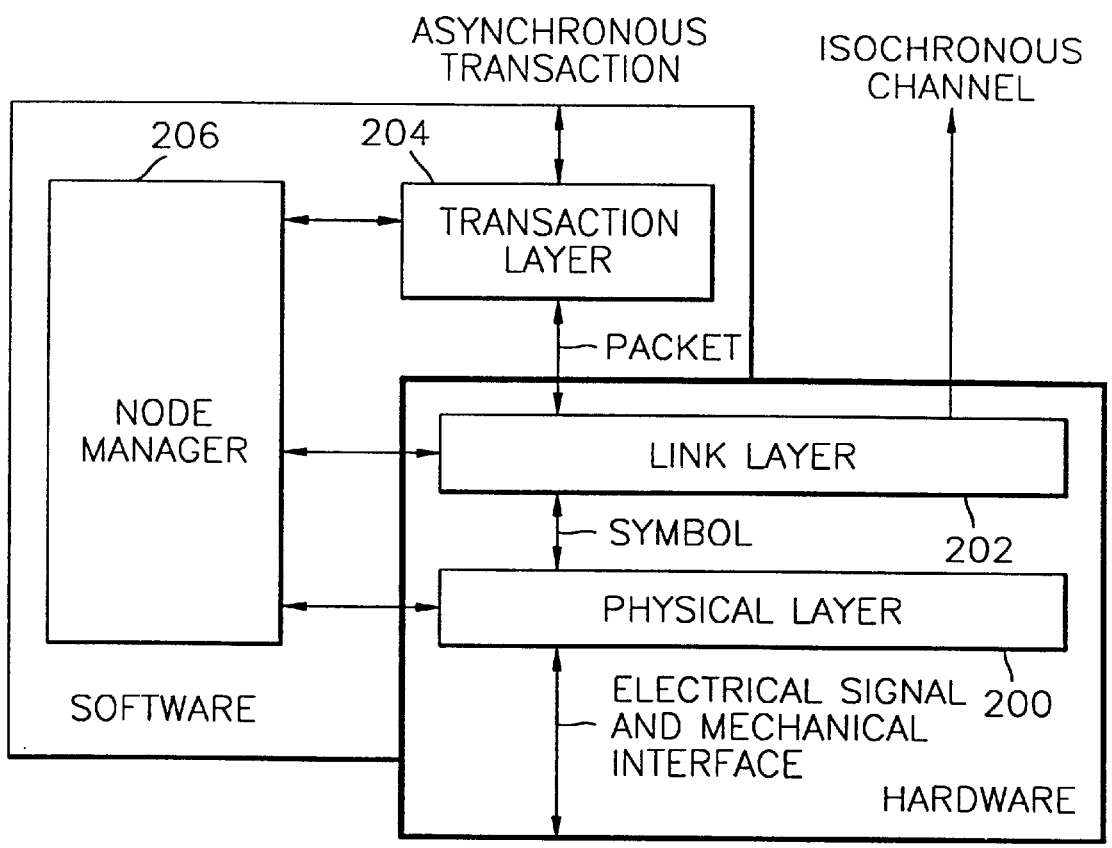

FIG. 2 schematically shows a protocol stack used by the IEEE 1394 equipment. The protocol stack shown in FIG. 2 is necessary in order to operate the IEEE 1394 bus. Here, a physical layer 200 and a link layer 202 are realized as hardware, i.e., as an integrated circuit (IC) chip. A transaction layer 204 and a node manager 206 are realized as software.

The state of the network connected by the IEEE 1394 bus changes from a normal bus operation state to a bus reset state when a new device is connected to the network through an arbitrary port, or when a previously connected apparatus is removed therefrom. Such a state change is sensed by the physical layer chip shown in FIG. 2. When the state change is sensed, a bus re-alignment process having the following sequence is performed.

In a bus reset state, a tree identification step is performed. In this step, it is sensed whether loops are formed in the connected state of a bus, and a root node for forming a tree is determined. Then, a self-identification step is performed. In this step, each node determines the IEEE 1394 node ID thereof and broadcasts this to other nodes. Then, an isochronous manager determining step is performed to determine a node for managing isochronous resources. Finally, a manager determining step is performed to determine a node for managing bus configuration information. By doing so, the bus reset state is restored to a normal bus operation state. Accordingly, data can be exchanged among nodes.

In such a bus reset process, data cannot be exchanged since the bus is not in the normal operation state. The bus is temporarily in the re-alignment state due to the bus reset generated either when a new apparatus is connected to the bus, or when a connected apparatus is separated from the bus in the network connected by the IEEE 1394 bus. During this time, video or audio data streams are interrupted. It takes about one second to reset the bus during which time a user experiences visual or aural interruption.

SUMMARY OF THE INVENTION

To solve the above problem, it is an objective of the present invention to provide a method of resetting a bus for the IEEE 1394 network by which it is possible to maintain normal data transmission and prevent data interruption, by performing a bus reset for the nodes of directly related ports in the bus without resetting all the nodes connected to the bus during such a bus reset.

Accordingly, to achieve the above objective, there is provided a bus reset method in a network in which a plurality of apparatuses are connected by the IEEE 1394 bus, comprising the steps of (a) sensing the state change of a port, (b) confirming whether loops exist in the bus when it is sensed in step (a) that a new apparatus is connected to an apparatus of the network, (c) transmitting the bus configuration information of a slave node from the slave node to a master node when it is confirmed that loops do not exist in the step (b), (d) re-configuring the bus of the network from the transmitted bus configuration information and the existing bus configuration information of the master node, and (e) broadcasting the re-configured bus configuration information to all apparatuses connected to the network.

The step (b) preferably comprises the steps of (b1) transmitting an extended unique ID (EUID) showing the configuration state of an apparatus from one node to the other between the two nodes related to the connection, and designating the node which transmits the EUID as a slave node and the node which receives the EUID as a master node, (b2) comparing the transmitted EUID with the EUID of each node of the existing bus configuration information included in the master node, and (b3) stopping the bus reset if it is determined from the comparison result in step (b2) that identical EUIDs exist and otherwise proceeding to the next stop.

The step (d) preferably comprises the steps of (d1) comparing the bus configuration information transmitted in the step (c) with the existent bus configuration information of the master node and (d2) determining node IDs based on the comparison result so that each node has a unique node ID in the bus.

The step (d) preferably comprises the step of re-configuring the bus of the network by extracting the information of the separated bus from the bus configuration information included in the port in the unconnected state when the result obtained in the step (b) corresponds to a case where an apparatus connected to the network is removed.

Preferably, the step of re-trying the step (b) after a predetermined time interval when it is confirmed that loops exist in the step (b) is further comprised.

BRIEF DESCRIPTION OF THE DRAWING(S)

Figure 3:
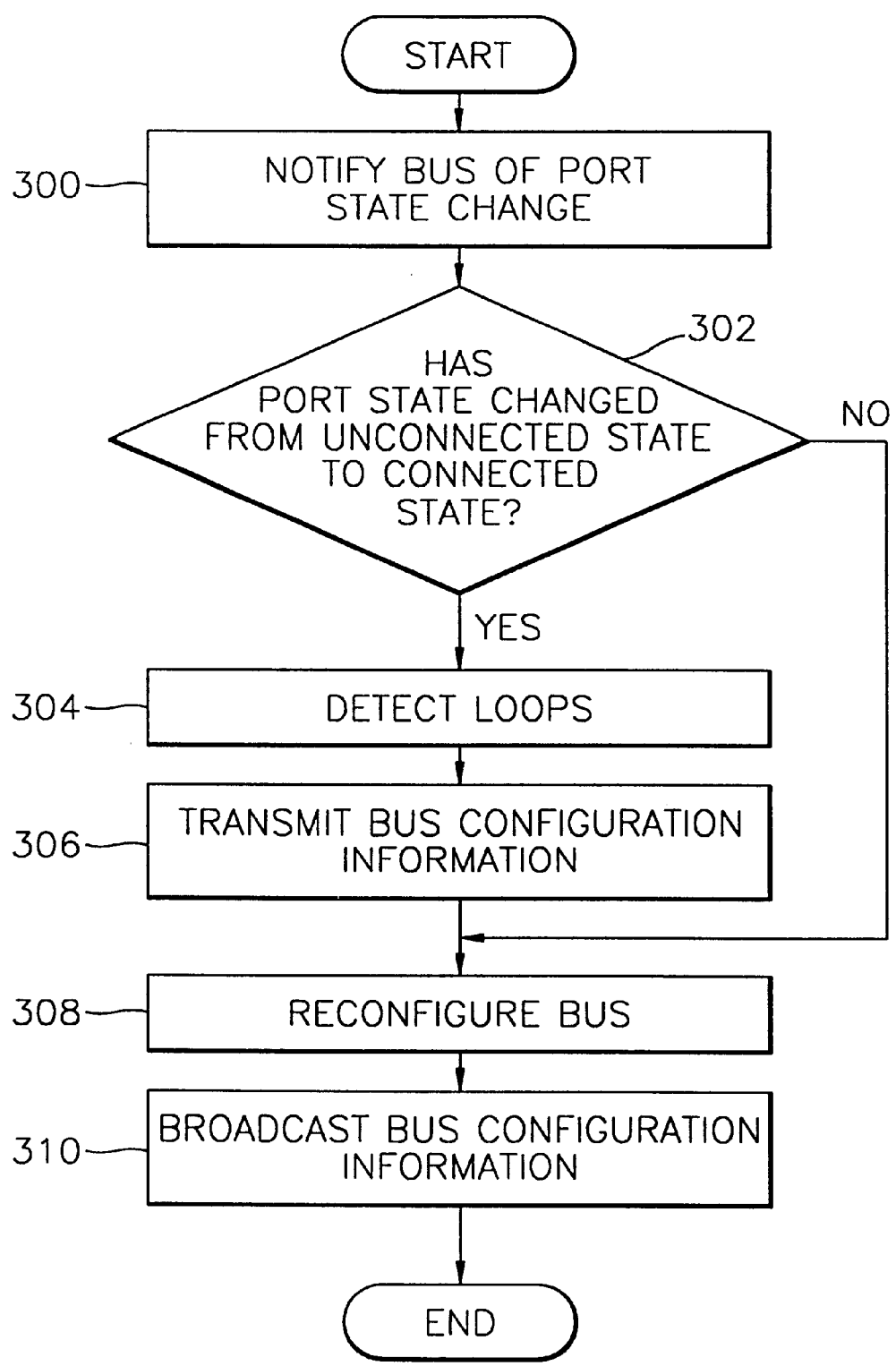
Figure 4:
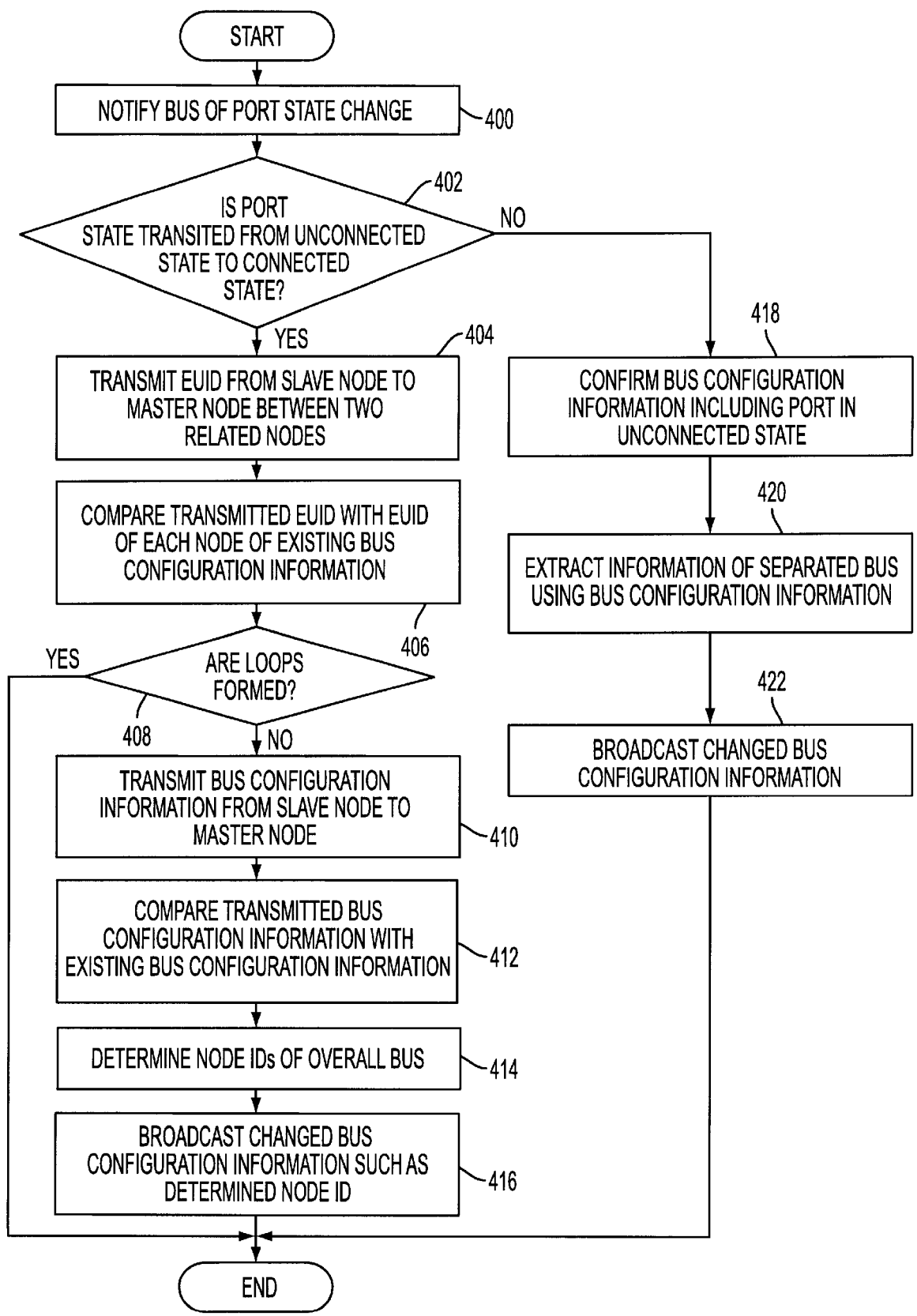

The above objective and advantages of the present invention will become more apparent by describing in detail a preferred embodiment thereof with reference to the attached drawings in which:

FIGS. 1(A)–1(B) show an example of a network including IEEE 1394 equipment;

FIG. 2 schematically shows a protocol stack used by IEEE 1394 equipment;

FIG. 3 is a flowchart for describing a method of resetting the bus of a network connected by the IEEE 1394 bus according to the present invention; and FIG. 4 is a flowchart according to a preferred embodiment of the method shown in FIG. 3.

DESCRIPTION OF THE PREFERRED EMBODIMENTS

Hereinafter, a method of resetting a bus for the IEEE 1394 network according to the present invention will be described in detail with reference to the attached drawings.

The bus is reset when a new apparatus is connected to the network by an obituary port connected by the IEEE 1394 bus, or a previously connected apparatus is removed from the network. Each apparatus includes a predetermined number of ports. The ports are in an unconnected or connected state.

When the state of a port is changed, the physical layer chip shown in FIG. 2 generates an interrupt and the status bit stored in a physical layer register corresponding to the port whose state is changed, is set. Such an operation is realized in hardware. The present invention is directed to removing data interruption due to the bus reset, which occurs in the conventional technology, by realizing as software the bus reset which is actually performed after the state change of the port is detected.

FIG. 3 is a flowchart showing an embodiment of the bus reset method for the IEEE 1394 network according to the present invention.

Referring to FIG. 3, according to the bus reset method of the present invention, a bus is notified of the port state change detected by the physical layer chip (PHY chip) (step 300). It is confirmed whether a new apparatus is connected to any apparatus of the network, namely, whether the state of the port has changed from the unconnected state to the connected state (step 302). When the state of the port has changed to the connected state, it is detected whether loops exist in the connection of the entire bus (step 304). It should be checked whether loops exist since there should be only one cable path for connecting one apparatus to another. When it is confirmed that loops exist, the bus reset is stopped. When loops do not exist, the bus configuration information of a slave node is transmitted from a master node to the slave node between two connected apparatuses (step 306).

The bus of the network is re-configured from the transmitted bus configuration information and the bus configuration information of the master node (step 308). Finally, the re-configured bus configuration is broadcast to all apparatuses connected to the network (step 310). Namely, in the bus reset method according to the present invention, not all the nodes connected to the bus participate in the bus reset process, and only the nodes of the port directly related to the bus reset perform the bus reset when a new apparatus is connected to the network.

When it is confirmed that an apparatus connected to the network is removed in the step 302, that is, when the state of the port changes from the connected state to the unconnected state, the process proceeds to the step 308 of re-configuring the bus without detecting whether loops exist in the connected state of the overall bus and without transmitting the bus configuration information of the slave node. Here, the node including the port changed to the unconnected state re-configures the bus of the network using the bus configuration information in the node. Finally, the re-configured bus configuration information is broadcast to all the apparatuses connected to the network (step 310). In the bus reset method according to the present invention, not all the nodes connected to the bus participate in the bus reset process, and only the nodes of the port directly related to the bus reset performs the bus reset when an apparatus connected to the network is removed.

FIG. 4 is a flowchart according to a preferred embodiment of the method shown in FIG. 3.

The bus reset method according to the present invention will be described in detail with reference to FIG. 4. First, a bus is notified of a change of state in a port, detected by the physical layer chip (step 400). That is, it is determined whether a new apparatus is connected to an apparatus of the network, namely, whether the state of the port has changed from the unconnected state to the connected state (step 402).

When the state of the port has changed to the connected state, an extended unique ID (EUID) for showing the configuration state of an apparatus is transmitted from one of the two nodes related to the connection to the other of the two nodes related to the connection in order to detect whether loops exist in the connected state of the overall bus. The node which transmits the EUID is designated as a slave node, and the node which receives the EUID is designated as a master node (step 404). If the two nodes simultaneously transmit the EUID after the port is changed to the connected state, each node re-tries to transmit the EUID at 30 $\mu$s intervals. Here, the EUID, which is information stored in the configuration ROM of the IEEE-1394 equipment, can be transmitted in the form of the physical layer packet. Here, it is necessary to newly define the IEEE-1394 physical layer packet format.

The master node compares the EUID transmitted from the slave node with the EUID of each node of the existing bus configuration information included therein (step 406). Then, it is determined whether loops exist in the connected state of the overall bus from the comparison result (step 408). If identical EUIDs exist, it is determined that loops exist. At this time, since the IEEE-1394 bus cannot perform normal operation, the bus reset is stopped.

Meanwhile, when loops do not exist, the slave node transmits the bus configuration information of the slave node, that is, the topology map information of the bus to which the slave node belonged to the master node in the form of a self-ID packet after the lapse of an appropriate time, for example, about 30 $\mu$s after the EUID is sent (step 410). When a bus manager exists as shown in FIG. 2, the topology map information is stored in the bus manager. When there is no bus manager, the topology map information can be extracted from the self-ID or the bus configuration information, received during the bus reset.

The master node which received the topology map of the bus from the slave node compares this information with the topology map information of the bus to which the master node belongs (step 412). The bus is re-configured by determining the node IDs for each node of the bus so that each node has a unique node ID in the bus from the comparison result (step 414). Here, the total number of nodes is preferably less than 64, considering the current level of development of the IEEE-1394 standard. Each node preferably has a unique node ID in the bus.

When the bus of the network is re-configured according to the determination of the node ID, the re-configured bus configuration information is broadcast to all the apparatuses connected to the network (step 416). That is, the master node broadcasts the node ID information determined in the step 414 to the bus to which the master node belongs. At this time, the form of reconfigured bus configuration information includes the existing ID (a specific ID in the case of a newly added node) of each node by extending the form of the self-ID packet from each node. Also, the master node transmits the information of the topology map changed by the step 414. Also, the slave node broadcasts the information of the changed topology map to the nodes to which the slave node belongs.

When it is confirmed that an apparatus connected to the network is removed in the step 402, that is, when the state of a port changes from the connected state to the unconnected state, the node having the port in the unconnected state confirms the bus configuration information included therein (step 418). At this time, the node having the port in the unconnected state is designated as a reset initiator node (RIN). The RIN extracts information of a separated bus such as the node ID using the bus configuration information included therein (step 420). Finally, the RIN broadcasts the extracted bus configuration change information, that is, information such as the node ID of the separated bus to the bus to which the RIN belongs (step 422).

As described above, in the bus reset method of the network connected by the IEEE 1394 bus according to the present invention, not all the nodes connected to the bus participate in the bus reset; instead, only the nodes of the port directly related to the bus reset perform the bus reset. Therefore, it is possible to prevent the interruption of data during the transmission of the isochronous data stream. For example, when the video transmitted from a video camera connected by the IEEE-1394 bus is seen through the PC, although another apparatus such as a hard disc is newly connected, a phenomenon where a video screen is instantaneously disconnected due to the bus reset does not occur, like in a conventional technology.

What is claimed is:

1. A bus reset method in a network in which a plurality of apparatuses are connected by the IEEE 1394 bus, comprising the steps of:

(a) sensing a state change of a port;

(b) confirming whether loops exist in the bus when it is sensed in step (a) that a new apparatus is connected to an apparatus of the network;

(c) transmitting the bus configuration information of a slave node from the slave node to a master node when it is confirmed that loops do not exist in the step (b);

(d) re-configuring the bus of the network from the transmitted bus configuration information and existing bus configuration information of the master node; and (e) broadcasting re-configured bus configuration information to all apparatuses connected to the network;

wherein the step (b) comprises the steps of:

(b1) transmitting an extended unique ID (EUID) showing a configuration state of an apparatus from one node to another between the two nodes related to the connection, and designating a node which transmits an EUID as a slave node and a node which receives the EUID as a master node;

(b2) comparing the transmitted EUID with the EUID of each node of the existing bus configuration information included in the master node; and (b3) stopping the bus reset if it is determined from the comparison result in step (b2) that identical EUIDs exist and otherwise proceeding to the next stop.

* * * * *